(12) United States Patent
Byeon et al.

(10) Patent No.: US 12,407,818 B2
(45) Date of Patent: Sep. 2, 2025

(54) METHOD AND APPARATUS FOR VIDEO CODING USING DERIVATION OF INTRA PREDICTION MODE

(71) Applicants: HYUNDAI MOTOR COMPANY, Seoul (KR); KIA CORPORATION, Seoul (KR); KWANGWOON UNIVERSITY INDUSTRY-ACADEMIC COLLABORATION FOUNDATION, Seoul (KR)

(72) Inventors: Joo Hyung Byeon, Seoul (KR); Sea Nae Park, Seoul (KR); Dong Gyu Sim, Seoul (KR); Seung Wook Park, Yongin-si (KR)

(73) Assignees: HYUNDAI MOTOR COMPANY, Seoul (KR); KIA CORPORATION, Seoul (KR); KWANGWOON UNIVERSITY INDUSTRY-ACADEMIC COLLABORATION FOUNDATION, Seoul (KR)

( * ) Notice: Subject to any disclaimer, the term of this patent is extended or adjusted under 35 U.S.C. 154(b) by 70 days.

(21) Appl. No.: 18/241,358

(22) Filed: Sep. 1, 2023

(65) Prior Publication Data

US 2023/0412799 A1 Dec. 21, 2023

Related U.S. Application Data

(63) Continuation of application No. PCT/KR2022/002985, filed on Mar. 3, 2022.

(30) Foreign Application Priority Data

Mar. 4, 2021 (KR) .................. 10-2021-0028795
Mar. 2, 2022 (KR) .................. 10-2022-0026549

(51) Int. Cl.
*H04N 19/11* (2014.01)
*H04N 19/105* (2014.01)
(Continued)

(52) U.S. Cl.
CPC .......... *H04N 19/11* (2014.11); *H04N 19/105* (2014.11); *H04N 19/119* (2014.11);
(Continued)

(58) Field of Classification Search
CPC .... H04N 19/105; H04N 19/11; H04N 19/119; H04N 19/132; H04N 19/136; H04N 19/593; H04N 19/70
See application file for complete search history.

(56) References Cited

U.S. PATENT DOCUMENTS 10,219,003 B2 2/2019 Huang et al.
11,252,403 B2 2/2022 Lee
(Continued)

FOREIGN PATENT DOCUMENTS

KR 101909170 B1 10/2018
KR 20200041810 A 4/2020

OTHER PUBLICATIONS

"Decoder-Side Intra Mode Derivation With Texture Analysis in VVC Test Model"—Nasrallah et al., 2019 IEEE International Conference on Image Processing (ICIP); Date Added to IEEE Xplore: Aug. 26, 2019 (Year: 2019).*
(Continued)

*Primary Examiner* — Mainul Hasan
(74) *Attorney, Agent, or Firm* — Lempia Summerfield Katz LLC

(57) ABSTRACT

A method and an apparatus for video coding using derivation of intra prediction modes are disclosed. The video coding method and the video coding apparatus derive the intra prediction mode of a current block using pre-restored,
(Continued)

neighboring reference sample values and generate a prediction block of the current block based on the derived prediction mode.

16 Claims, 10 Drawing Sheets

(51) Int. Cl.
| | |
|---|---|
| *H04N 19/119* | (2014.01) |
| *H04N 19/132* | (2014.01) |
| *H04N 19/136* | (2014.01) |
| *H04N 19/176* | (2014.01) |
| *H04N 19/182* | (2014.01) |
| *H04N 19/593* | (2014.01) |
| *H04N 19/70* | (2014.01) |

(52) U.S. Cl.
CPC ......... *H04N 19/132* (2014.11); *H04N 19/136* (2014.11); *H04N 19/176* (2014.11); *H04N 19/182* (2014.11); *H04N 19/593* (2014.11); *H04N 19/70* (2014.11)

(56) References Cited

U.S. PATENT DOCUMENTS

| | | | |
|---|---|---|---|
| 2011/0002385 A1* | 1/2011 | Kobayashi | H04N 19/14 |
| | | | 375/E7.243 |
| 2016/0014421 A1* | 1/2016 | Cote | H04N 19/14 |
| | | | 382/170 |
| 2017/0078696 A1 | 3/2017 | Huang et al. | |
| 2019/0110076 A1* | 4/2019 | Lim | H04N 19/46 |
| 2019/0215521 A1 | 7/2019 | Chuang et al. | |
| 2020/0296356 A1* | 9/2020 | Mora | G06N 7/01 |
| 2021/0227208 A1 | 7/2021 | Lee | |
| 2021/0377568 A1* | 12/2021 | Koo | H04N 19/119 |
| 2022/0094912 A1 | 3/2022 | Lee | |
| 2022/0224922 A1* | 7/2022 | Wang | H04N 19/147 |
| 2023/0109828 A1* | 4/2023 | Lee | H04N 19/11 |
| | | | 375/240.12 |
| 2024/0137560 A1* | 4/2024 | Kim | H04N 19/70 |

OTHER PUBLICATIONS

"Gradient-Based Intraprediction Fusion for Video Coding"—Abdoli et al., IEEE MultiMedia (vol. 28, Issue: 3, Jul. 1-Sep. 2021); Date of Publication: Dec. 3, 2020 (Year: 2020).*

Abdoli, Mohsen, et al., Decoder-Side Intra Mode Derivation For Next Generation Video Coding, 2020 IEEE International Conference on Multimedia and Expo (ICME), Jul. 6-10, 2020, 7 pp, DOI: 10.1109/ICME46284.2020.9102799.

Abdoli, Mohsen, et al., Non-CE3: Decoder-side Intra Mode Derivation with Prediction Fusion Using Planar, Joint Video Experts Team (JVET) of ITU-T SG 16 WP 3 and ISO/IEC JTC 1/SC 29/WG 11 15th Meeting: Gothenburg, SE, Jul. 3-12, 2019, 10 pp, DOI:10. 13140/RG.2.2.11924.14725.

International Search Report and Written Opinion cited in corresponding international app No. PCT/KR2022/002985 ; Jun. 14, 2022; 11 pp.

* cited by examiner

Vertical direction mode

Horizontal direction mode

Diagonal direction mode

METHOD AND APPARATUS FOR VIDEO CODING USING DERIVATION OF INTRA PREDICTION MODE

CROSS-REFERENCE TO RELATED APPLICATIONS

This application is a Continuation of International Application No. PCT/KR2022/002985 filed on Mar. 3, 2022, which claims priority to Korean Patent Application No. 10-2021-0028795 filed on Mar. 4, 2021, and Korean Patent Application No. 10-2022-0026549 filed on Mar. 2, 2022, the entire disclosures of each of which are incorporated herein by reference.

TECHNICAL FIELD

The present disclosure relates to a video coding method and a device using a method and apparatus for video coding using derivation of an intra prediction mode.

BACKGROUND

The statements in this section merely provide background information related to the present disclosure and do not necessarily constitute prior art.

Since video data has a large amount of data compared to audio or still image data, the video data requires a lot of hardware resources, including memory, to store or transmit the video data without processing for compression.

Accordingly, an encoder is generally used to compress and store or transmit video data. A decoder receives the compressed video data, decompresses the received compressed video data, and plays the decompressed video data. Video compression techniques include H.264/AVC, High Efficiency Video Coding (HEVC), and Versatile Video Coding (VVC), which has improved coding efficiency by about 30% or more compared to HEVC.

However, since the image size, resolution, and frame rate gradually increase, the amount of data to be encoded also increases. Accordingly, a new compression technique providing higher coding efficiency and an improved image enhancement effect than existing compression techniques is required. In particular, in terms of coding efficiency, it is necessary to consider an approach of deriving the intra prediction mode of a current block rather than parsing the intra prediction mode.

SUMMARY

The present disclosure seeks to provide a video coding method and an apparatus that derive the intra prediction mode of a current block using pre-restored, neighboring reference sample values and generate a prediction block of the current block based on the derived prediction mode.

At least one aspect of the present disclosure provides a method performed by a video decoding apparatus for intra prediction of a current block. The method comprises parsing a prediction mode derivation flag indicating whether to derive a prediction mode of the current block from a bitstream and comprises checking the prediction mode derivation flag. When the prediction mode derivation flag is true, the method includes determining a calculation area used for calculating gradient values from restored neighboring samples of the current block; calculating a gradient histogram of directional modes in the calculation area for the current block; deriving a prediction mode of the current block based on the gradient histogram; and generating a prediction block of the current block by performing intra prediction using the derived prediction mode.

Another aspect of the present disclosure provides an intra prediction apparatus. The apparatus comprises a prediction mode derivation determining unit configured to determine whether to derive a prediction mode of a current block by parsing a prediction mode derivation flag from a bitstream. The apparatus also comprises a gradient calculation area determining unit configured to determine a calculation area used for calculating gradient values from restored neighboring samples of the current block. The apparatus also comprises a histogram calculation unit configured to calculate a gradient histogram of directional modes in the calculation area for the current block. The apparatus also comprises a prediction mode deriving unit configured to derive a prediction mode of the current block based on the gradient histogram. The apparatus also comprises an intra prediction performing unit configured to generate a prediction block of the current block by performing intra prediction using the derived prediction mode.

As described above, the present disclosure provides a video coding method and an apparatus that derive the intra prediction mode of a current block using pre-restored, neighboring reference sample values and generate a prediction block of the current block based on the derived prediction mode to improve the coding efficiency.

DETAILED DESCRIPTION

Figure 1:
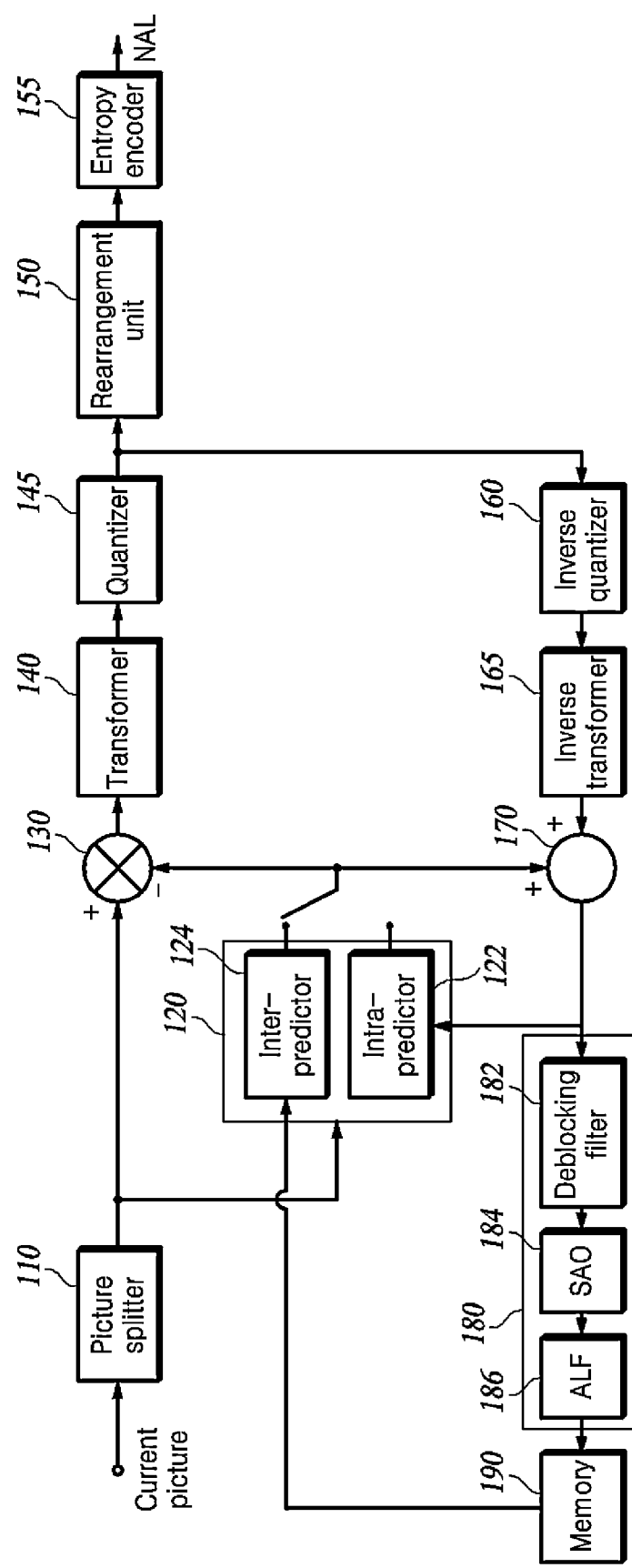
FIG. 1 is a block diagram of a video encoding apparatus that may implement the techniques of the present disclosure.

Hereinafter, some embodiments of the present disclosure are described in detail with reference to the accompanying illustrative drawings. In the following description, like reference numerals designate like elements, although the elements are shown in different drawings. Further, in the following description of some embodiments, detailed descriptions of related known components and functions when considered to obscure the subject of the present disclosure may be omitted for the purpose of clarity and for brevity.

FIG. 1 is a block diagram of a video encoding apparatus that may implement technologies of the present disclosure. Hereinafter, referring to illustration of FIG. 1, the video encoding apparatus and components of the apparatus are described.

The encoding apparatus may include a picture splitter 110, a predictor 120, a subtractor 130, a transformer 140, a quantizer 145, a rearrangement unit 150, an entropy encoder 155, an inverse quantizer 160, an inverse transformer 165, an adder 170, a loop filter unit 180, and a memory 190.

Each component of the encoding apparatus may be implemented as hardware or software or implemented as a combination of hardware and software. Further, a function of each component may be implemented as software, and a microprocessor may also be implemented to execute the function of the software corresponding to each component.

One video is constituted by one or more sequences including a plurality of pictures. Each picture is split into a plurality of areas, and encoding is performed for each area. For example, one picture is split into one or more tiles or/and slices. Here, one or more tiles may be defined as a tile group. Each tile or/and slice is split into one or more coding tree units (CTUs). In addition, each CTU is split into one or more coding units (CUs) by a tree structure. Information applied to each CU is encoded as a syntax of the CU and information commonly applied to the CUs included in one CTU is encoded as the syntax of the CTU. Further, information commonly applied to all blocks in one slice is encoded as the syntax of a slice header, and information applied to all blocks constituting one or more pictures is encoded to a picture parameter set (PPS) or a picture header. Furthermore, information, which the plurality of pictures commonly refers to, is encoded to a sequence parameter set (SPS). In addition, information, which one or more SPS commonly refer to, is encoded to a video parameter set (VPS). Further, information commonly applied to one tile or tile group may also be encoded as the syntax of a tile or tile group header. The syntaxes included in the SPS, the PPS, the slice header, the tile, or the tile group header may be referred to as a high level syntax.

The picture splitter 110 determines a size of a coding tree unit (CTU). Information on the size of the CTU (CTU size) is encoded as the syntax of the SPS or the PPS and delivered to a video decoding apparatus.

The picture splitter 110 splits each picture constituting the video into a plurality of CTUs having a predetermined size and then recursively splits the CTU by using a tree structure. A leaf node in the tree structure becomes the CU, which is a basic unit of encoding.

The tree structure may be a quadtree (QT) in which a higher node (or a parent node) is split into four lower nodes (or child nodes) having the same size. The tree structure may also be a binarytree (BT) in which the higher node is split into two lower nodes. The tree structure may also be a ternarytree (TT) in which the higher node is split into three lower nodes at a ratio of 1:2:1. The tree structure may also be a structure in which two or more structures among the QT structure, the BT structure, and the TT structure are mixed. For example, a quadtree plus binarytree (QBT) structure may be used or a quadtree plus binarytree ternarytree (QTBTTT) structure may be used. Here, a BTTT is added to the tree structures to be referred to as a multiple-type tree (MTT).

Figure 2:
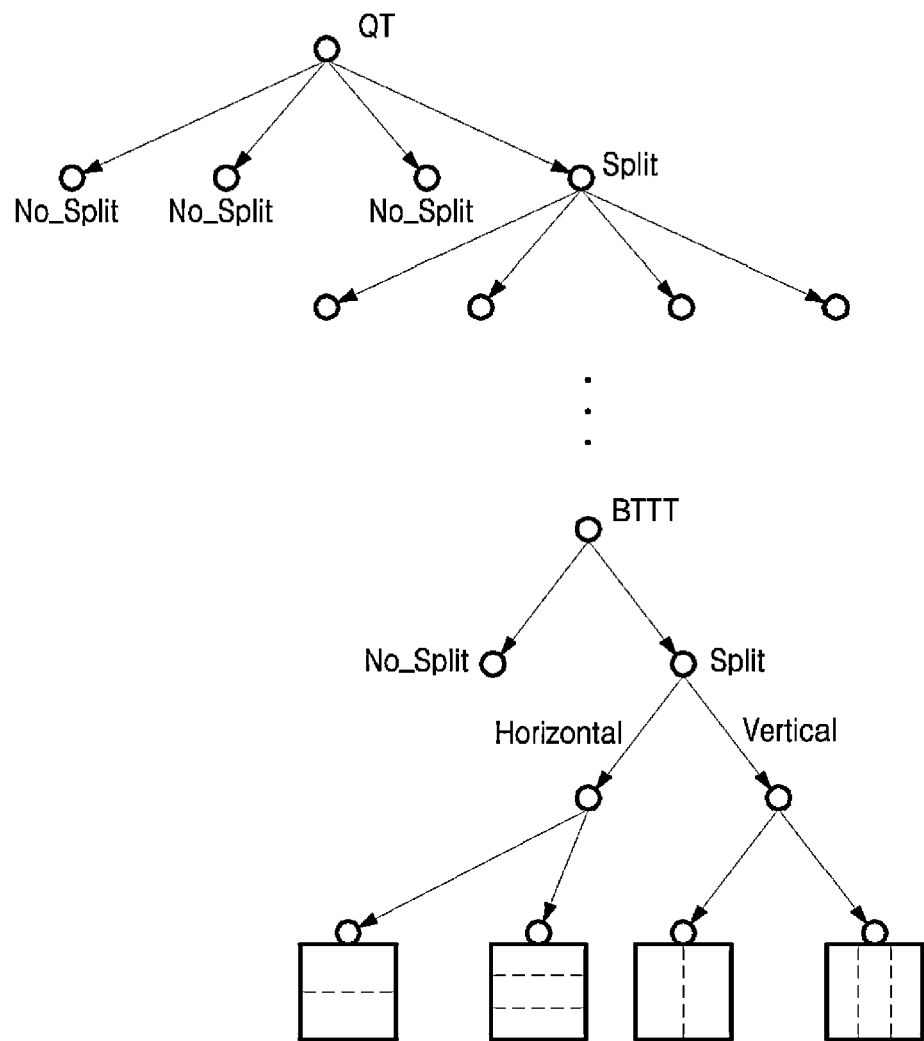
FIG. 2 illustrates a method for partitioning a block using a quadtree plus binarytree ternarytree (QTBTTT) structure.

FIG. 2 is a diagram for describing a method for splitting a block by using a QTBTTT structure.

As illustrated in FIG. 2, the CTU may first be split into the QT structure. Quadtree splitting may be recursive until the size of a splitting block reaches a minimum block size (MinQTSize) of the leaf node permitted in the QT. A first flag (QT_split_flag) indicating whether each node of the QT structure is split into four nodes of a lower layer is encoded by the entropy encoder 155 and signaled to the video decoding apparatus. When the leaf node of the QT is not larger than a maximum block size (MaxBTSize) of a root node permitted in the BT, the leaf node may be further split into at least one of the BT structure or the TT structure. A plurality of split directions may be present in the BT structure and/or the TT structure. For example, there may be two directions, i.e., a direction in which the block of the corresponding node is split horizontally and a direction in which the block of the corresponding node is split vertically. As illustrated in FIG. 2, when the MTT splitting starts, a second flag (mtt_split_flag) indicating whether the nodes are split, and a flag additionally indicating the split direction (vertical or horizontal), and/or a flag indicating a split type (binary or ternary) if the nodes are split are encoded by the entropy encoder 155 and signaled to the video decoding apparatus.

Alternatively, prior to encoding the first flag (QT_split_flag) indicating whether each node is split into four nodes of the lower layer, a CU split flag (split_cu_flag) indicating whether the node is split may also be encoded. When a value of the CU split flag (split_cu_flag) indicates that each node is not split, the block of the corresponding node becomes the leaf node in the split tree structure and becomes the CU, which is the basic unit of encoding. When the value of the CU split flag (split_cu_flag) indicates that each node is split, the video encoding apparatus starts encoding the first flag first by the above-described scheme.

When the QTBT is used as another example of the tree structure, there may be two types, i.e., a type (i.e., symmetric horizontal splitting) in which the block of the corresponding node is horizontally split into two blocks having the same size and a type (i.e., symmetric vertical splitting) in which the block of the corresponding node is vertically split into two blocks having the same size. A split flag (split_flag) indicating whether each node of the BT structure is split into the block of the lower layer and split type information indicating a splitting type are encoded by the entropy encoder 155 and delivered to the video decoding apparatus. Meanwhile, a type in which the block of the corresponding node is split into two blocks of a form of being asymmetrical to each other may be additionally present. The asymmetrical form may include a form in which the block of the corresponding node split into two rectangular blocks having a size ratio of 1:3 or may also include a form in which the block of the corresponding node is split in a diagonal direction.

The CU may have various sizes according to QTBT or QTBTTT splitting from the CTU. Hereinafter, a block corresponding to a CU (i.e., the leaf node of the QTBTTT) to be encoded or decoded is referred to as a "current block". As the QTBTTT splitting is adopted, a shape of the current block may also be a rectangular shape in addition to a square shape.

The predictor 120 predicts the current block to generate a prediction block. The predictor 120 includes an intra predictor 122 and an inter predictor 124.

In general, each of the current blocks in the picture may be predictively coded. In general, the prediction of the current block may be performed by using an intra prediction technology (using data from the picture including the current block) or an inter prediction technology (using data from a picture coded before the picture including the current block). The inter prediction includes both unidirectional prediction and bidirectional prediction.

Figure 3A:
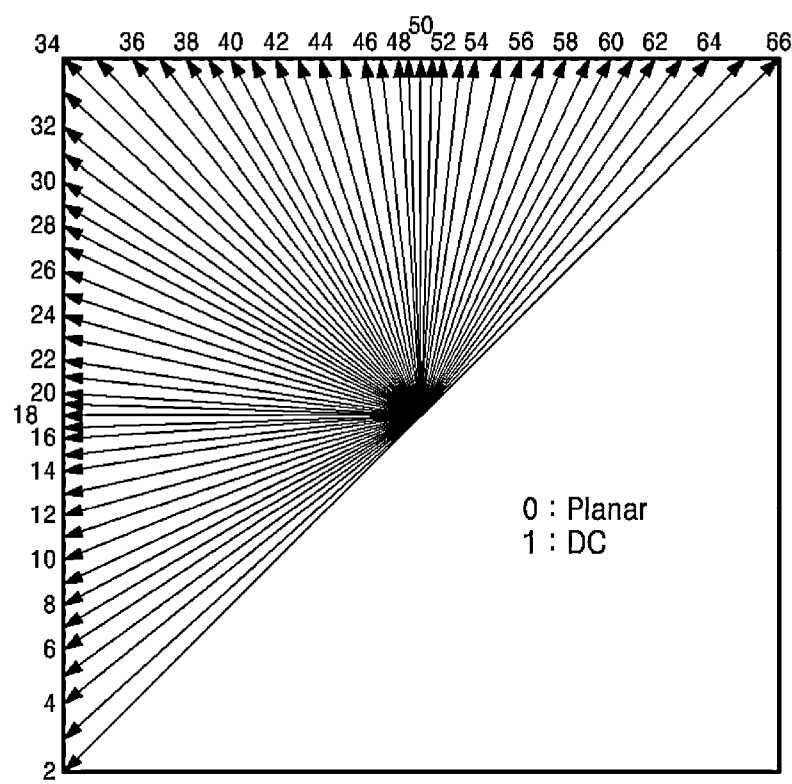
FIGS. 3A and 3B illustrate a plurality of intra prediction modes including wide-angle intra prediction modes.

The intra predictor 122 predicts pixels in the current block by using pixels (reference pixels) positioned on a neighbor of the current block in the current picture including the current block. There is a plurality of intra prediction modes according to the prediction direction. For example, as illustrated in FIG. 3A, the plurality of intra prediction modes may include 2 non-directional modes including a Planar mode and a DC mode and may include 65 directional modes. A neighboring pixel and an arithmetic equation to be used are defined differently according to each prediction mode.

Figure 3B:
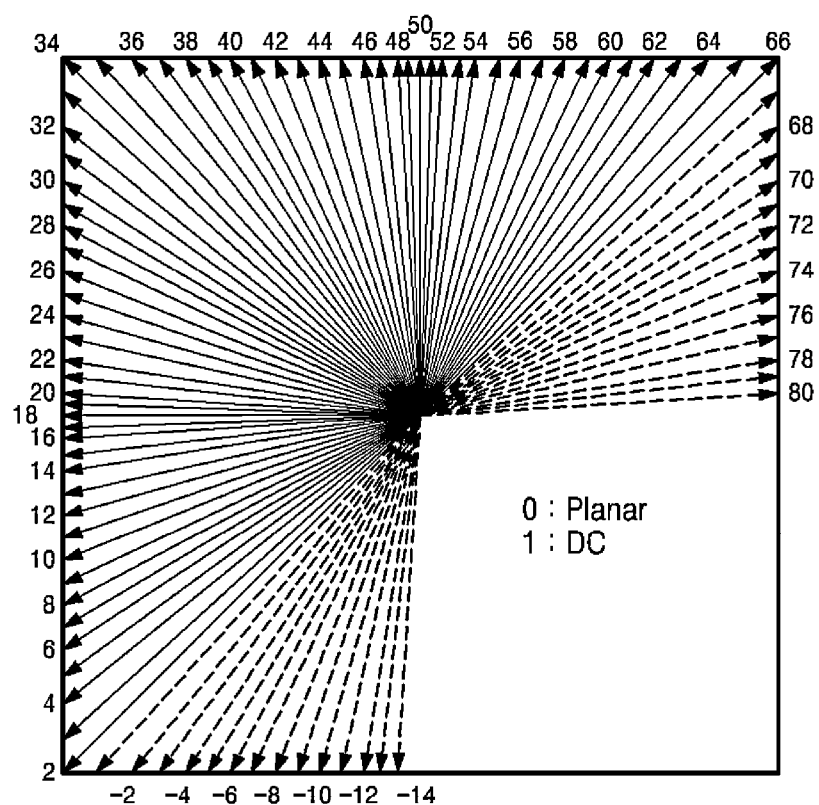

For efficient directional prediction for the current block having the rectangular shape, directional modes (#67 to #80, intra prediction modes #-1 to #-14) illustrated as dotted arrows in FIG. 3B may be additionally used. The directional modes may be referred to as "wide angle intra-prediction modes". In FIG. 3B, the arrows indicate corresponding reference samples used for the prediction and do not represent the prediction directions. The prediction direction is opposite to a direction indicated by the arrow. When the current block has the rectangular shape, the wide angle intra-prediction modes are modes in which the prediction is performed in an opposite direction to a specific directional mode without additional bit transmission. In this case, among the wide angle intra-prediction modes, some wide angle intra-prediction modes usable for the current block may be determined by a ratio of a width and a height of the current block having the rectangular shape. For example, when the current block has a rectangular shape in which the height is smaller than the width, wide angle intra-prediction modes (intra prediction modes #67 to #80) having an angle smaller than 45 degrees are usable. When the current block has a rectangular shape in which the width is larger than the height, the wide angle intra-prediction modes having an angle larger than −135 degrees are usable.

The intra predictor 122 may determine an intra prediction to be used for encoding the current block. In some examples, the intra predictor 122 may encode the current block by using multiple intra prediction modes and also select an appropriate intra prediction mode to be used from tested modes. For example, the intra predictor 122 may calculate rate-distortion values by using a rate-distortion analysis for multiple tested intra prediction modes and also select an intra prediction mode having best rate-distortion features among the tested modes.

The intra predictor 122 selects one intra prediction mode among a plurality of intra prediction modes and predicts the current block by using a neighboring pixel (reference pixel) and an arithmetic equation determined according to the selected intra prediction mode. Information on the selected intra prediction mode is encoded by the entropy encoder 155 and delivered to the video decoding apparatus.

The inter predictor 124 generates the prediction block for the current block by using a motion compensation process. The inter predictor 124 searches a block most similar to the current block in a reference picture encoded and decoded earlier than the current picture and generates the prediction block for the current block by using the searched block. In addition, a motion vector (MV) is generated, which corresponds to a displacement between the current bock in the current picture and the prediction block in the reference picture. In general, motion estimation is performed for a luma component, and a motion vector calculated based on the luma component is used for both the luma component and a chroma component. Motion information including information on the reference picture and information on the motion vector used for predicting the current block is encoded by the entropy encoder 155 and delivered to the video decoding apparatus.

The inter predictor 124 may also perform interpolation for the reference picture or a reference block in order to increase accuracy of the prediction. In other words, sub-samples between two contiguous integer samples are interpolated by applying filter coefficients to a plurality of contiguous integer samples including two integer samples. When a process of searching a block most similar to the current block is performed for the interpolated reference picture, not integer sample unit precision but decimal unit precision may be expressed for the motion vector. Precision or resolution of the motion vector may be set differently for each target area to be encoded, e.g., a unit such as the slice, the tile, the CTU, the CU, etc. When such an adaptive motion vector resolution (AMVR) is applied, information on the motion vector resolution to be applied to each target area should be signaled for each target area. For example, when the target area is the CU, the information on the motion vector resolution applied for each CU is signaled. The information on the motion vector resolution may be information representing precision of a motion vector difference to be described below.

Meanwhile, the inter predictor 124 may perform inter prediction by using bi-prediction. In the case of the bi-prediction, two reference pictures and two motion vectors representing a block position most similar to the current block in each reference picture are used. The inter predictor 124 selects a first reference picture and a second reference picture from reference picture list 0 (RefPicList0) and reference picture list 1 (RefPicList1), respectively. The inter predictor 124 also searches blocks most similar to the current blocks in the respective reference pictures to generate a first reference block and a second reference block. In addition, the prediction block for the current block is generated by averaging or weighted-averaging the first reference block and the second reference block. In addition, motion information including information on two reference pictures used for predicting the current block and information on two motion vectors is delivered to the entropy encoder 155. Here, reference picture list 0 may be constituted by pictures before the current picture in a display order among pre-restored pictures, and reference picture list 1 may be constituted by pictures after the current picture in the display order among the pre-restored pictures. However, although not particularly limited thereto, the pre-restored pictures after the current picture in the display order may be additionally included in reference picture list 0. Inversely, the pre-restored pictures before the current picture may also be additionally included in reference picture list 1.

In order to minimize a bit quantity consumed for encoding the motion information, various methods may be used.

For example, when the reference picture and the motion vector of the current block are the same as the reference picture and the motion vector of the neighboring block, information capable of identifying the neighboring block is encoded to deliver the motion information of the current block to the video decoding apparatus. Such a method is referred to as a merge mode.

In the merge mode, the inter predictor 124 selects a predetermined number of merge candidate blocks (hereinafter, referred to as a "merge candidate") from the neighboring blocks of the current block.

Figure 4:
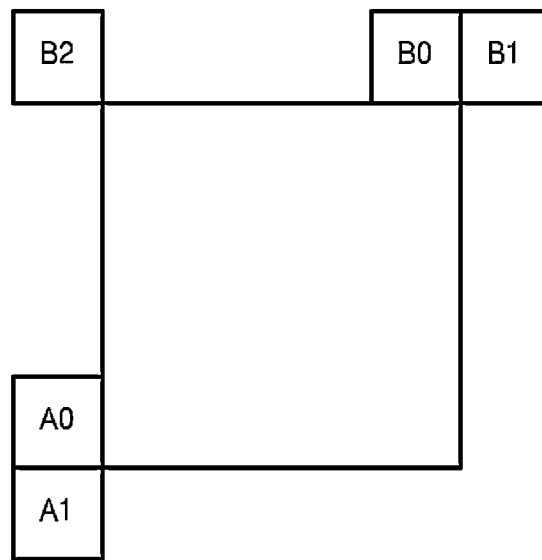
FIG. 4 illustrates neighboring blocks of a current block.

As a neighboring block for deriving the merge candidate, all or some of a left block A0, a bottom left block A1, a top block B0, a top right block B1, and a top left block B2 adjacent to the current block in the current picture may be used as illustrated in FIG. 4. Further, a block positioned within the reference picture (may be the same as or different from the reference picture used for predicting the current block) other than the current picture at which the current block is positioned may also be used as the merge candidate. For example, a co-located block with the current block within the reference picture or blocks adjacent to the co-located block may be additionally used as the merge candidate. If the number of merge candidates selected by the method described above is smaller than a preset number, a zero vector is added to the merge candidate.

The inter predictor 124 configures a merge list including a predetermined number of merge candidates by using the neighboring blocks. A merge candidate to be used as the motion information of the current block is selected from the merge candidates included in the merge list, and merge index information for identifying the selected candidate is generated. The generated merge index information is encoded by the entropy encoder 155 and delivered to the video decoding apparatus.

The merge skip mode is a special case of the merge mode. After quantization, when all transform coefficients for entropy encoding are close to zero, only the neighboring block selection information is transmitted without transmitting residual signals. By using the merge skip mode, it is possible to achieve a relatively high encoding efficiency for images with slight motion, still images, screen content images, and the like.

Hereafter, the merge mode and the merge skip mode are collectively referred to as the merge/skip mode.

Another method for encoding the motion information is an advanced motion vector prediction (AMVP) mode.

In the AMVP mode, the inter predictor 124 derives motion vector predictor candidates for the motion vector of the current block by using the neighboring blocks of the current block. As a neighboring block used for deriving the motion vector predictor candidates, all or some of a left block A0, a bottom left block A1, a top block B0, a top right block B1, and a top left block B2 adjacent to the current block in the current picture illustrated in FIG. 4 may be used. Further, a block positioned within the reference picture (may be the same as or different from the reference picture used for predicting the current block) other than the current picture at which the current block is positioned may also be used as the neighboring block used for deriving the motion vector predictor candidates. For example, a co-located block with the current block within the reference picture or blocks adjacent to the co-located block may be used. If the number of motion vector candidates selected by the method described above is smaller than a preset number, a zero vector is added to the motion vector candidate.

The inter predictor 124 derives the motion vector predictor candidates by using the motion vector of the neighboring blocks and determines motion vector predictor for the motion vector of the current block by using the motion vector predictor candidates. In addition, a motion vector difference is calculated by subtracting motion vector predictor from the motion vector of the current block.

The motion vector predictor may be acquired by applying a pre-defined function (e.g., center value and average value computation, etc.) to the motion vector predictor candidates. In this case, the video decoding apparatus also knows the pre-defined function. Further, since the neighboring block used for deriving the motion vector predictor candidate is a block in which encoding and decoding are already completed, the video decoding apparatus may also already know the motion vector of the neighboring block. Therefore, the video encoding apparatus does not need to encode information for identifying the motion vector predictor candidate. Accordingly, in this case, information on the motion vector difference and information on the reference picture used for predicting the current block are encoded.

Meanwhile, the motion vector predictor may also be determined by a scheme of selecting any one of the motion vector predictor candidates. In this case, information for identifying the selected motion vector predictor candidate is additional encoded jointly with the information on the motion vector difference and the information on the reference picture used for predicting the current block.

The subtractor 130 generates a residual block by subtracting the prediction block generated by the intra predictor 122 or the inter predictor 124 from the current block.

The transformer 140 transforms residual signals in a residual block having pixel values of a spatial domain into transform coefficients of a frequency domain. The transformer 140 may transform residual signals in the residual block by using a total size of the residual block as a transform unit or also split the residual block into a plurality of subblocks and may perform the transform by using the subblock as the transform unit. Alternatively, the residual block is divided into two subblocks, which are a transform area and a non-transform area, to transform the residual signals by using only the transform area subblock as the transform unit. Here, the transform area subblock may be one of two rectangular blocks having a size ratio of 1:1 based on a horizontal axis (or vertical axis). In this case, a flag (cu_sbt_flag) indicates that only the subblock is transformed, and directional (vertical/horizontal) information (cu_sbt_horizontal_flag) and/or positional information (cu_sbt_pos_flag) are encoded by the entropy encoder 155 and signaled to the video decoding apparatus. Further, a size of the transform area subblock may have a size ratio of 1:3 based on the horizontal axis (or vertical axis). In this case, a flag (cu_sbt_quad_flag) dividing the corresponding splitting is additionally encoded by the entropy encoder 155 and signaled to the video decoding apparatus.

Meanwhile, the transformer 140 may perform the transform for the residual block individually in a horizontal direction and a vertical direction. For the transform, various types of transform functions or transform matrices may be used. For example, a pair of transform functions for horizontal transform and vertical transform may be defined as a multiple transform set (MTS). The transformer 140 may select one transform function pair having highest transform efficiency in the MTS and may transform the residual block in each of the horizontal and vertical directions. Information (mts_idx) on the transform function pair in the MTS is encoded by the entropy encoder 155 and signaled to the video decoding apparatus.

The quantizer 145 quantizes the transform coefficients output from the transformer 140 using a quantization parameter and outputs the quantized transform coefficients to the entropy encoder 155. The quantizer 145 may also immediately quantize the related residual block without the transform for any block or frame. The quantizer 145 may also apply different quantization coefficients (scaling values) according to positions of the transform coefficients in the transform block. A quantization matrix applied to transform coefficients quantized arranged in 2 dimensional may be encoded and signaled to the video decoding apparatus.

The rearrangement unit 150 may perform realignment of coefficient values for quantized residual values.

The rearrangement unit 150 may change a 2D coefficient array to a 1D coefficient sequence by using coefficient scanning. For example, the rearrangement unit 150 may output the 1D coefficient sequence by scanning a DC coefficient to a high-frequency domain coefficient by using a zig-zag scan or a diagonal scan. According to the size of the transform unit and the intra prediction mode, vertical scan of scanning a 2D coefficient array in a column direction and horizontal scan of scanning a 2D block type coefficient in a row direction may also be used instead of the zig-zag scan. In other words, according to the size of the transform unit and the intra prediction mode, a scan method to be used may be determined among the zig-zag scan, the diagonal scan, the vertical scan, and the horizontal scan.

The entropy encoder 155 generates a bitstream by encoding a sequence of 1D quantized transform coefficients output from the rearrangement unit 150 by using various encoding schemes including a Context-based Adaptive Binary Arithmetic Code (CABAC), an Exponential Golomb, or the like.

Further, the entropy encoder 155 encodes information such as a CTU size, a CTU split flag, a QT split flag, an MTT split type, an MTT split direction, etc., related to the block splitting to allow the video decoding apparatus to split the block equally to the video encoding apparatus. Further, the entropy encoder 155 encodes information on a prediction type indicating whether the current block is encoded by intra prediction or inter prediction. The entropy encoder 155 encodes intra prediction information (i.e., information on an intra prediction mode) or inter prediction information (in the case of the merge mode, a merge index and in the case of the AMVP mode, information on the reference picture index and the motion vector difference) according to the prediction type. Further, the entropy encoder 155 encodes information related to quantization, i.e., information on the quantization parameter and information on the quantization matrix.

The inverse quantizer 160 dequantizes the quantized transform coefficients output from the quantizer 145 to generate the transform coefficients. The inverse transformer 165 transforms the transform coefficients output from the inverse quantizer 160 into a spatial domain from a frequency domain to restore the residual block.

The adder 170 adds the restored residual block and the prediction block generated by the predictor 120 to restore the current block. Pixels in the restored current block may be used as reference pixels when intra-predicting a next-order block.

The loop filter unit 180 performs filtering for the restored pixels in order to reduce blocking artifacts, ringing artifacts, blurring artifacts, etc., which occur due to block based prediction and transform/quantization. The loop filter unit 180 as an in-loop filter may include all or some of a deblocking filter 182, a sample adaptive offset (SAO) filter 184, and an adaptive loop filter (ALF) 186.

The deblocking filter 182 filters a boundary between the restored blocks in order to remove a blocking artifact, which occurs due to block unit encoding/decoding, and the SAO filter 184 and the ALF 186 perform additional filtering for a deblocked filtered video. The SAO filter 184 and the ALF 186 are filters used for compensating differences between the restored pixels and original pixels, which occur due to lossy coding. The SAO filter 184 applies an offset as a CTU unit to enhance a subjective image quality and encoding efficiency. On the other hand, the ALF 186 performs block unit filtering and compensates distortion by applying different filters by dividing a boundary of the corresponding block and a degree of a change amount. Information on filter coefficients to be used for the ALF may be encoded and signaled to the video decoding apparatus.

The restored block filtered through the deblocking filter 182, the SAO filter 184, and the ALF 186 is stored in the memory 190. When all blocks in one picture are restored, the restored picture may be used as a reference picture for inter predicting a block within a picture to be encoded afterwards.

Figure 5:
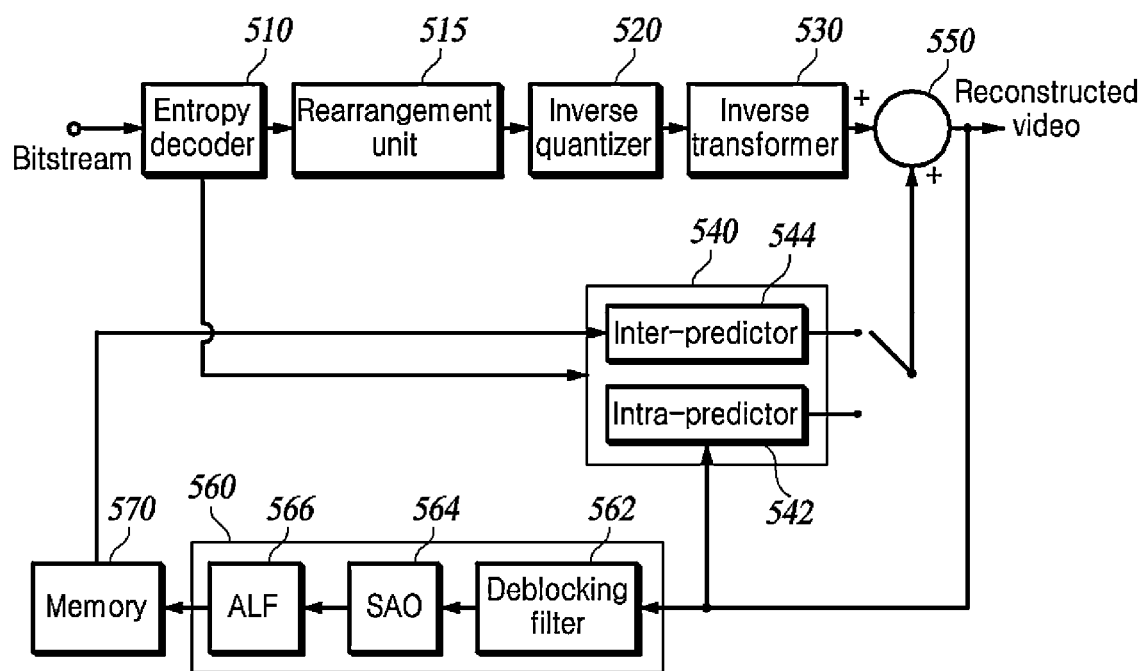
FIG. 5 is a block diagram of a video decoding apparatus that may implement the techniques of the present disclosure.

FIG. 5 is a functional block diagram of a video decoding apparatus that may implement the technologies of the present disclosure. Hereinafter, referring to FIG. 5, the video decoding apparatus and components of the apparatus are described.

The video decoding apparatus may include an entropy decoder 510, a rearrangement unit 515, an inverse quantizer 520, an inverse transformer 530, a predictor 540, an adder 550, a loop filter unit 560, and a memory 570.

Similar to the video encoding apparatus of FIG. 1, each component of the video decoding apparatus may be implemented as hardware or software or implemented as a combination of hardware and software. Further, a function of each component may be implemented as the software, and a microprocessor may also be implemented to execute the function of the software corresponding to each component.

The entropy decoder 510 extracts information related to block splitting by decoding the bitstream generated by the video encoding apparatus to determine a current block to be decoded and extracts prediction information required for restoring the current block and information on the residual signals.

The entropy decoder 510 determines the size of the CTU by extracting information on the CTU size from a sequence parameter set (SPS) or a picture parameter set (PPS) and splits the picture into CTUs having the determined size. In addition, the CTU is determined as a highest layer of the tree structure, i.e., a root node, and split information for the CTU may be extracted to split the CTU by using the tree structure.

For example, when the CTU is split by using the QTBTTT structure, a first flag (QT_split_flag) related to splitting of the QT is first extracted to split each node into four nodes of the lower layer. In addition, a second flag (mtt_split_flag), a split direction (vertical/horizontal), and/or a split type (binary/ternary) related to splitting of the MTT are extracted with respect to the node corresponding to the leaf node of the QT to split the corresponding leaf node into an MTT structure. As a result, each of the nodes below the leaf node of the QT is recursively split into the BT or TT structure.

As another example, when the CTU is split by using the QTBTTT structure, a CU split flag (split_cu_flag) indicating whether the CU is split is extracted. When the corresponding block is split, the first flag (QT_split_flag) may also be extracted. During a splitting process, with respect to each node, recursive MTT splitting of 0 times or more may occur after recursive QT splitting of 0 times or more. For example, with respect to the CTU, the MTT splitting may immediately occur or on the contrary, only QT splitting of multiple times may also occur.

As another example, when the CTU is split by using the QTBT structure, the first flag (QT_split_flag) related to the splitting of the QT is extracted to split each node into four nodes of the lower layer. In addition, a split flag (split_flag) indicating whether the node corresponding to the leaf node of the QT being further split into the BT, and split direction information are extracted.

Meanwhile, when the entropy decoder 510 determines a current block to be decoded by using the splitting of the tree structure, the entropy decoder 510 extracts information on a prediction type indicating whether the current block is intra predicted or inter predicted. When the prediction type information indicates the intra prediction, the entropy decoder 510 extracts a syntax element for intra prediction information (intra prediction mode) of the current block. When the prediction type information indicates the inter prediction, the entropy decoder 510 extracts information representing a syntax element for inter prediction information, i.e., a motion vector and a reference picture to which the motion vector refers.

Further, the entropy decoder 510 extracts quantization related information and extracts information on the quantized transform coefficients of the current block as the information on the residual signals.

The rearrangement unit 515 may change a sequence of 1D quantized transform coefficients entropy-decoded by the entropy decoder 510 to a 2D coefficient array (i.e., block) again in a reverse order to the coefficient scanning order performed by the video encoding apparatus.

The inverse quantizer 520 dequantizes the quantized transform coefficients and dequantizes the quantized transform coefficients by using the quantization parameter. The inverse quantizer 520 may also apply different quantization coefficients (scaling values) to the quantized transform coefficients arranged in 2D. The inverse quantizer 520 may perform dequantization by applying a matrix of the quantization coefficients (scaling values) from the video encoding apparatus to a 2D array of the quantized transform coefficients.

The inverse transformer 530 generates the residual block for the current block by restoring the residual signals by inversely transforming the dequantized transform coefficients into the spatial domain from the frequency domain.

Further, when the inverse transformer 530 inversely transforms a partial area (subblock) of the transform block, the inverse transformer 530 extracts a flag (cu_sbt_flag) that only the subblock of the transform block is transformed, directional (vertical/horizontal) information (cu_sbt_horizontal_flag) of the subblock, and/or positional information (cu_sbt_pos_flag) of the subblock. The inverse transformer 530 also inversely transforms the transform coefficients of the corresponding subblock into the spatial domain from the frequency domain to restore the residual signals and fills an area, which is not inversely transformed, with a value of "0" as the residual signals to generate a final residual block for the current block.

Further, when the MTS is applied, the inverse transformer 530 determines the transform index or the transform matrix to be applied in each of the horizontal and vertical directions by using the MTS information (mts_idx) signaled from the video encoding apparatus. The inverse transformer 530 also performs inverse transform for the transform coefficients in the transform block in the horizontal and vertical directions by using the determined transform function.

The predictor 540 may include the intra predictor 542 and the inter predictor 544. The intra predictor 542 is activated when the prediction type of the current block is the intra prediction, and the inter predictor 544 is activated when the prediction type of the current block is the inter prediction.

The intra predictor 542 determines the intra prediction mode of the current block among the plurality of intra prediction modes from the syntax element for the intra prediction mode extracted from the entropy decoder 510. The intra predictor 542 also predicts the current block by using neighboring reference pixels of the current block according to the intra prediction mode.

The inter predictor 544 determines the motion vector of the current block and the reference picture to which the motion vector refers by using the syntax element for the inter prediction mode extracted from the entropy decoder 510.

The adder 550 restores the current block by adding the residual block output from the inverse transformer 530 and the prediction block output from the inter predictor 544 or the intra predictor 542. Pixels within the restored current block are used as a reference pixel upon intra predicting a block to be decoded afterwards.

The loop filter unit 560 as an in-loop filter may include a deblocking filter 562, an SAO filter 564, and an ALF 566. The deblocking filter 562 performs deblocking filtering a boundary between the restored blocks in order to remove the blocking artifact, which occurs due to block unit decoding. The SAO filter 564 and the ALF 566 perform additional filtering for the restored block after the deblocking filtering in order to compensate differences between the restored pixels and original pixels, which occur due to lossy coding. The filter coefficients of the ALF are determined by using information on filter coefficients decoded from the bitstream.

The restored block filtered through the deblocking filter 562, the SAO filter 564, and the ALF 566 is stored in the memory 570. When all blocks in one picture are restored, the restored picture may be used as a reference picture for inter predicting a block within a picture to be encoded afterwards.

The present disclosure in some embodiments relates to encoding and decoding video images as described above. More specifically, the present disclosure provides a video coding method and a video coding apparatus that derive the intra prediction mode of a current block using pre-restored, neighboring reference sample values and generate a prediction block of the current block based on the derived prediction mode.

The following embodiments may be applied to the entropy decoder 510 and the intra predictor 542 in the video decoding device. The following embodiments may also be applied to the intra predictor 122 in the video encoding device.

In the following description, a block has an aspect ratio that is defined as the horizontal length (W:Width) of the block divided by the vertical length (H:Height), i.e., the ratio between the horizontal length and the vertical length.

Hereinafter, a particular flag being true indicates that the value of that flag is 1, and a particular flag being false indicates that the value of the flag is 0.

In the following description, intra prediction is described with respect to the video decoding apparatus, and the video encoding apparatus may be mentioned if necessary for the sake of convenience. Also, the descriptions below may be similarly applied to the video encoding apparatus.

Hereinafter, the phrase that the video decoding device or its internal entropy decoder 510 decodes data from the bitstream is used interchangeably with the phrase that the same device or unit parses data.

I. Intra Prediction and Intra Sub-Partitions (ISP)

In the Versatile Video Coding (VVC) technique, the luma block has the intra-prediction modes of non-directional modes (i.e., planar and DC) and the remaining subdivided directional modes (i.e., modes 2 to 66), as exemplified in FIG. 3A. As added for example in FIG. 3B, the luma block further has the intra-prediction modes of directional modes (modes −14 to −1 and modes 67 to 80) based on the wide-angle intra-prediction.

In the Versatile Video Coding (VVC) technique, the luma block has the intra-prediction modes of non-directional modes (i.e., planar and DC) and the remaining subdivided directional modes (i.e., modes 2 to 66), as exemplified in FIG. 3A. As added for example in FIG. 3B, the luma block further has the intra-prediction modes of directional modes (modes −14 to −1 and modes 67 to 80) based on the wide-angle intra-prediction.

In the following descriptions, a large block before being partitioned is referred to as a current block, and each of the subpartitioned smaller blocks is referred to as a subblock.

The operation of ISP technique is as follows.

The video encoding apparatus transmits intra_subpartitions_mode_flag and intra_subpartitions_split_flag when the ISP enable flag sps_isp_enabled_flag on the SPS, which lies in the high level, is true. The video decoding apparatus first parses the ISP enable flag sps_isp_enabled_flag from the bitstream. When the ISP enable flag is true, the video decoding apparatus may decode intra_subpartitions_mode_flag and intra_subpartitions_split_flag from the bitstream.

The video encoding apparatus signals intra_subpartitions_mode_flag indicating whether to apply ISP and intra_subpartitions_split_flag indicating a subpartitioning method to the video decoding apparatus. Table 1 shows the subpartition type IntraSubPartitionsSplitType according to intra_subpartitions_mode_flag and intra_subpartitions_split_flag.

TABLE 1

| IntraSubPartitionsSplitType | Name of IntraSubPartitionsSplitType |
|---|---|
| 0 | ISP_NO_SPLIT |
| 1 | ISP_HOR_SPLIT |
| 2 | ISP_VER_SPLIT |

The ISP technique sets the subpartition type IntraSubPartitionsSplitType as follows.

When intra_subpartitions_mode_flag is 0, IntraSubPartitionsSplitType is set to 0, and subblock partitioning is not performed (ISP_NO_SPLIT). That is, the ISP is not applied.

If intra_subpartitions_mode_flag is not 0, ISP is applied. At this time, IntraSubPartitionsSplitType is set to a value of 1+intra_subpartitions_split_flag, and subblock partitioning is performed according to the subpartition type. If IntraSubPartitionsSplitType=1, horizontal subblock splitting (ISP_HOR_SPLIT) is performed, and if IntraSubPartitionsSplitType=2, subblock splitting is performed in vertical direction (ISP_VER_SPLIT). In other words, intra_subpartitions_split_flag may indicate a subblock partitioning direction.

For example, when an ISP mode indicating subpartitioning in the horizontal direction is applied to a current block, IntraSubPartitionsSplitType is 1, intra_subpartitions_mode_flag is 1, and intra_subpartitions_split_flag is 0.

In the following description, intra_subpartitions_mode_flag is expressed as a subblock partitioning application flag, intra_subpartitions_split_flag is expressed as a subblock partitioning direction flag, and IntraSubPartitionsSplitType is expressed as a subblock partitioning type.

II. Derivation of Intra Prediction Mode

In the following description, referring to FIG. 6, an intra prediction device using prediction mode derivation is described.

Figure 6:
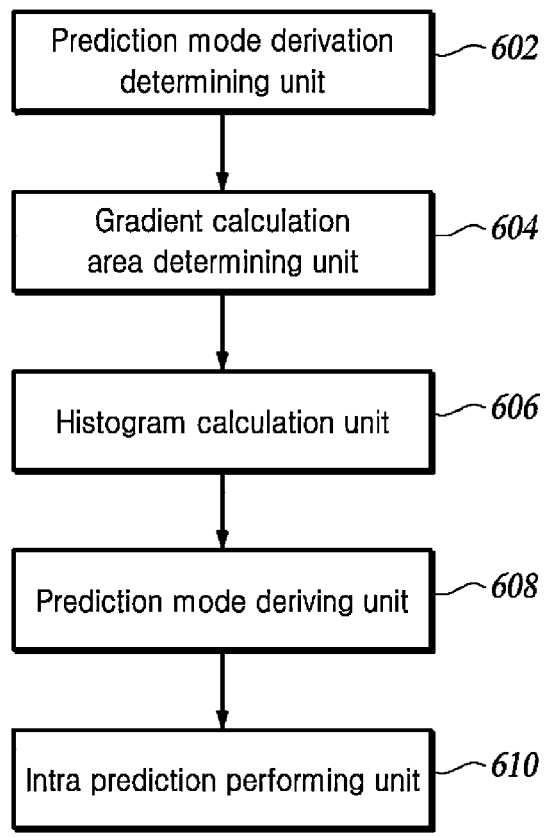
FIG. 6 is a block diagram of an intra prediction device using prediction mode derivation according to one embodiment of the present disclosure.

FIG. 6 is a block diagram of an intra prediction device using prediction mode derivation according to one embodiment of the present disclosure.

The intra prediction device according to the present embodiment calculates a histogram from gradients of pre-restored, neighboring reference sample values, derives an intra prediction mode of a current block using the calculated histogram, and generates a prediction block of the current block based on the derived prediction mode. The intra prediction device includes all or part of a prediction mode derivation determining unit 602, a gradient calculation area determining unit 604, a histogram calculation unit 606, a prediction mode deriving unit 608, and an intra prediction performing unit 610.

The prediction mode derivation determining unit 602 parses a flag indicating whether to derive the prediction mode of a current block to determine the derivation of the intra prediction mode. In the following description, the above flag is referred to as a prediction mode derivation flag. The video encoding apparatus may set the prediction mode derivation flag in terms of rate-distortion optimization and then may transmit the set prediction mode derivation flag to the video decoding apparatus. After decoding the prediction mode derivation flag from the bitstream, the video decoding apparatus may perform the steps described below. Meanwhile, the video encoding apparatus may obtain a prediction mode derivation flag from the high level and perform subsequent steps.

When the prediction mode derivation flag is true, the intra prediction device derives the intra prediction mode based on the restored neighboring samples of the current block while omitting the parsing of the intra prediction mode of the current block. At this time, when the current block is unable to use the left and/or upper reference samples, including the picture boundary, slice boundary, or tile boundary, decoding of the prediction mode derivation flag may be implicitly omitted.

As another embodiment, before determining whether to perform prediction mode derivation, the intra prediction device may parse, from a bitstream, one or a plurality of flags that determine whether the prediction mode of a current block is a non-directional mode, such as the Planar, DC, or matrix-based mode. When all the corresponding flags are 0, the prediction mode derivation determining unit 602 may parse the prediction mode derivation flag and then may determine whether to perform the prediction mode derivation.

Also, after the prediction mode derivation determining unit 602 determines to derive prediction modes, the intra prediction device may decode the subblock partitioning application flag from the bitstream and determine whether to apply the ISP technique, namely, whether to perform subblock partitioning of the current block.

Figure 7:
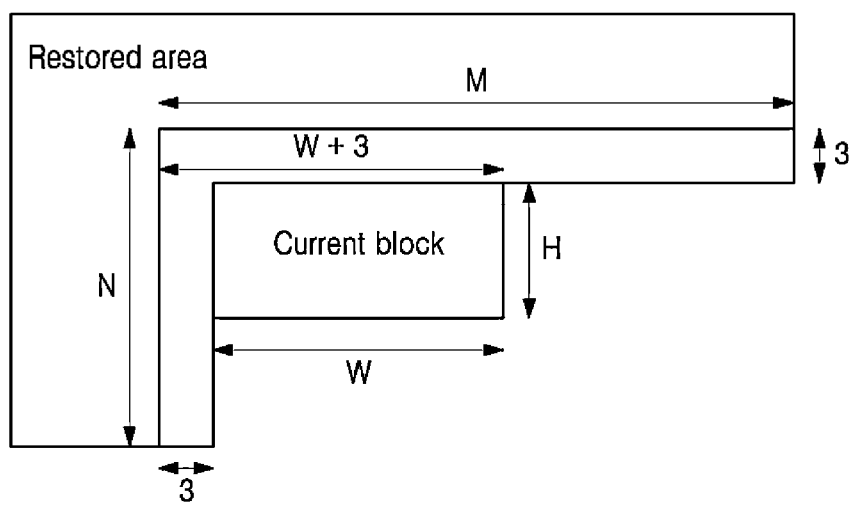
FIG. 7 illustrates a calculation area used for calculating gradient values according to one embodiment of the present disclosure.

FIG. 7 illustrates a calculation area used for calculating gradient values according to one embodiment of the present disclosure.

The gradient calculation area determining unit 604 determines a calculation area used for calculating gradient values from restored neighboring samples of the current block to derive an intra prediction mode. As shown in FIG. 7, three rows of restored reference pixels belonging to the restored area located on the left and top of the current block may be used as the gradient calculation area. In the example of FIG. 7, the length M of the upper reference samples and the length N of the left reference samples may be set based on the width W and height H of the current block. For example, based on the (−3, −3) pixel located at the top left of the current block, M is set to a value such as W+3, 2×W+3, or W+H+3, and N is set to a value such as H+3, 2×H+3, or W+H+3.

As another embodiment, the gradient calculation area determining unit 604 may parse a flag indicating the calculation area from a bitstream to set the left or upper side of the current block as the calculation area. Alternatively, the gradient calculation area determining unit 604 may parse an index indicating the calculation area from the bitstream to determine the left, upper, or left/upper side of the current block as the calculation area.

As another embodiment, the calculation area may be implicitly determined according to an agreement between the video encoding apparatus and the video decoding apparatus. In this case, the operation of the gradient calculation area determining unit 604 may be omitted.

The histogram calculation unit 606 calculates a gradient histogram H( ) of directional modes in the gradient calculation area. First, vertical and horizontal gradient values may be calculated in a 3×3 area, a 3×1 area, or a 1×3 area based on the restored reference samples on the current block's second lines. The histogram calculation unit 606 may calculate the gradient using an edge detection filter such as the Sobel or Prewitt filter. Table 2 shows examples of filters used in the calculation of the gradient.

TABLE 2

|  | Horizontal filter | Vertical filter |
|---|---|---|
| Filter example 1 | −1 0 1<br>−2 0 2<br>−1 0 1 | −1 −2 −1<br>0 0 0<br>1 2 1 |
| Filter example 2 | −1 0 1<br>−1 0 1<br>−1 0 1 | −1 −1 −1<br>0 0 0<br>1 1 1 |
| Filter example 3 | −1 0 1 | −1<br>0<br>1 |

As shown in Eq. 1, the histogram calculation unit 606 may determine the gradient direction θ and magnitude 1 at the corresponding pixel based on the calculated vertical/horizontal direction gradient Gv/Gh.

$$\vartheta = arctam\left(\frac{Gv}{Gh}\right) \qquad [\text{Eq. 1}]$$

$$l = \sqrt{Gv^2 + Gh^2}$$

Figure 8:
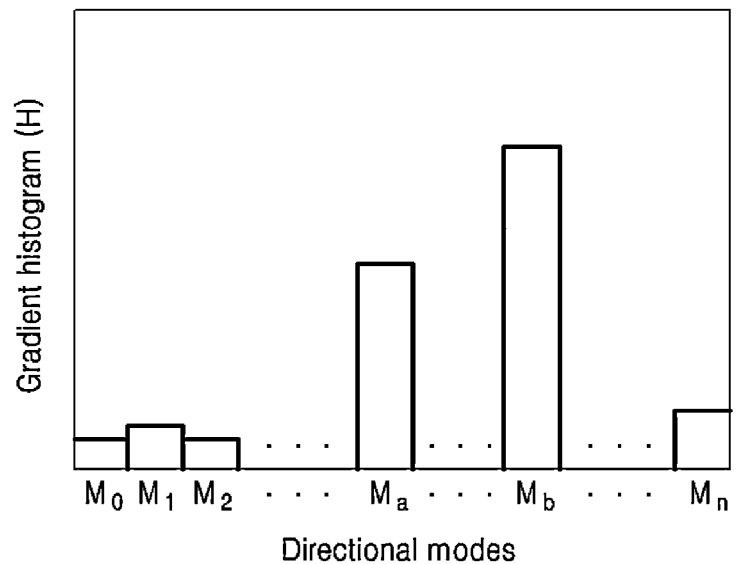
FIG. 8 illustrates a gradient histogram of directional modes according to one embodiment of the present disclosure.

FIG. 8 illustrates a gradient histogram of directional modes according to one embodiment of the present disclosure.

The histogram calculation unit 606 calculates the directional mode of intra prediction closest to the gradient direction θ according to the corresponding direction for pixels within the calculation area, accumulates the gradient magnitude 1 in the histogram of the corresponding directional mode, and generates a gradient histogram H( ) of directional modes, as shown in FIG. 8.

Figure 9:
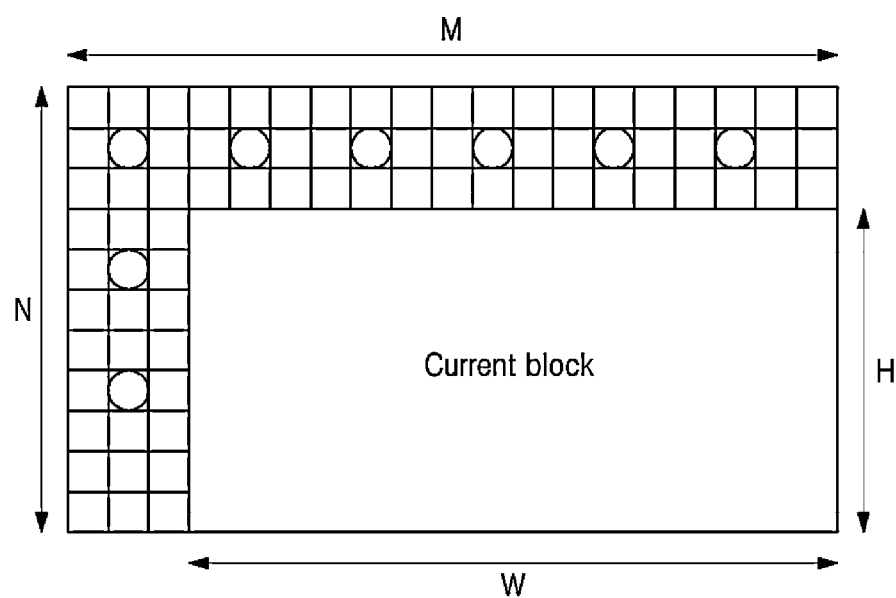
FIG. 9 illustrates sub-sampled pixels for which gradient values are calculated according to one embodiment of the present disclosure.

As shown in FIG. 9, when calculating the gradient histogram, the histogram calculation unit 606 may subsample pixels based on a preset sampling interval and then may calculate a gradient histogram using the subsampled pixels. At this time, the sampling interval and subsampling positions of pixels may be defined according to an agreement between the video encoding apparatus and the video decoding apparatus. Alternatively, sampling intervals and subsampling positions of pixels may be determined based on the size and/or the aspect ratio of the current block.

The prediction mode deriving unit 608 derives prediction modes of a current block based on the gradient histogram, as shown in FIG. 8. At this time, the derived intra prediction mode may be a directional mode or a non-directional mode. Also, the derived intra prediction mode may include both the directional and non-directional modes.

The prediction mode deriving unit 608 may derive directional modes as follows.

The prediction mode deriving unit 608 may determine the mode $M_b$ having the largest value from the calculated histogram as the intra prediction mode of a current block.

Alternatively, the prediction mode deriving unit 608 may determine the mode $M_b$ having the first largest value and the mode $M_a$ having the second largest value as the intra prediction modes of the current block. By using the weights obtained from the histogram values of the two modes, the intra prediction device performs weighted averaging on the predicted signals $P_1$ and $P_2$ predicted using the two modes $M_b$ and $M_a$ to generate the final predicted signals.

As another embodiment, the prediction mode deriving unit 608 additionally parses a flag indicating one of the mode $M_b$ having the largest gradient histogram value and the mode $M_a$ having the second largest gradient histogram value to determine the prediction mode of the current block according to the parsed flag value. In the following description, the above flag is referred to as a prediction mode indication flag. The prediction mode deriving unit 608 may parse the prediction mode indication flag from a bitstream when the difference between the histogram values of the two modes is less than or equal to a predetermined threshold value. On the other hand, when the difference between the histogram values of the two modes is greater than the predetermined threshold value, the prediction mode deriving unit 608 may skip parsing the prediction mode indication flag. Alternatively, as shown in Eq. 2, when the difference between the two histogram values is greater than or equal to a preset ratio compared to the sum of all histogram values, the prediction mode deriving unit 608 may skip parsing the prediction mode indication flag.

$$\frac{(H(M_b) - H(M_a))}{\sum_{i=0}^{n} H(M_i)} \geq Thr1 \qquad [\text{Eq. 2}]$$

In another embodiment, the prediction mode deriving unit 608 may parse the index of a delta mode for the default mode exhibiting the largest histogram value from a bitstream to determine the prediction mode. For example, the delta mode may be an offset for the default mode. Therefore, the prediction mode deriving unit 608 may determine the prediction mode by adding the delta mode to the default mode. At this time, the index indicating the delta mode may be set according to an agreement between the video encoding apparatus and the video decoding apparatus. Also, the delta mode may be changed according to the default mode.

Meanwhile, the prediction mode deriving unit 608 may derive the non-directional mode as follows.

When the largest histogram value of the directional mode is smaller than a preset threshold or the sum of all histogram values is smaller than a preset threshold, the prediction mode deriving unit 608 may set the non-directional mode as the prediction mode of the current block. At this time, the non-directional mode may be the DC mode or the Planar mode, where the prediction mode deriving unit 608 may always determine the prediction mode of the current block as the DC mode (or Planar mode). Alternatively, the prediction mode deriving unit 608 may parse a flag indicating one of the modes from the bitstream and may determine one of the two modes according to the parsed flag. Meanwhile, the predetermined threshold may be set according to an agreement between the video encoding apparatus and the video decoding apparatus or may be transmitted from the video encoding apparatus to the video decoding apparatus per picture or slice basis at a higher level.

In another embodiment, as shown in Eq. 3, when the largest histogram value of the directional mode is smaller than a preset ratio compared to the sum of all histogram values, the prediction mode deriving unit 608 may determine the non-directional mode as the prediction mode of a current block.

$$\frac{H(M_b)}{\sum_{i=0}^{n} H(M_i)} < Thr2 \quad \text{[Eq. 3]}$$

At this time, the preset threshold may be determined based on the size of the current block.

In yet another embodiment, when a value obtained by dividing the sum of all histogram values by the number of pixels used for gradient calculation is smaller than a preset threshold, the prediction deriving unit 608 may determine the non-directional mode as the prediction mode of the current block. Also, when a value obtained by dividing the largest histogram value of the directional mode by the number of pixels used for gradient calculation is smaller than a preset threshold, the prediction mode deriving unit 608 may determine the non-directional mode as the prediction mode of the current block.

Also, when a value obtained by dividing the sum of all histogram values by the number of gradients used for histogram calculation is smaller than a preset threshold, the prediction deriving unit 608 may determine the non-directional mode as the prediction mode of the current block. Also, when a value obtained by dividing the largest histogram value of the directional mode by the number of gradients used for histogram calculation is smaller than a preset threshold, the prediction mode deriving unit 608 may determine the non-directional mode as the prediction mode of the current block.

Meanwhile, according to Table 2, the number of pixels used for gradient calculation may be 9 or 3 times the number of gradients used for histogram calculation.

In still another embodiment, when the derived prediction mode of a current block is the directional mode, the prediction mode deriving unit 608 may add the non-directional mode as the prediction mode of a current block. At this time, the added non-directional mode may be set according to an agreement between the video encoding apparatus and the video decoding apparatus.

The intra prediction performing unit 610 generates a prediction block of the current block by performing intra prediction using the derived prediction mode. The intra prediction performing unit 610 may perform intra prediction using reference samples belonging to the left and top lines closest to the current block among the left and top restored reference samples without additional parsing. Alternatively, the intra prediction performing unit 610 may determine reference sample lines for intra prediction by parsing an index indicating which reference sample line is to be used among multi-line reference samples.

In one embodiment, the intra prediction performing unit 610 may generate signal $P_1$ predicted from the direction mode $M_b$ having the largest gradient histogram value as the predicted signal $P_d$. Also, as described above, the intra prediction performing unit 610 may generate the predicted signal $P_d$ by performing weighted averaging on signal $P_1$ predicted from the directional mode $M_b$ having the largest gradient histogram value and signal $P_2$ predicted from the mode $M_a$ having the second largest gradient histogram value. At this time, weight values may be determined in proportion to the histogram values of the respective modes.

In another embodiment, when the derived mode is the directional mode as described above, the intra prediction performing unit 610 may additionally use a preset non-directional mode (e.g., Planar). As shown in Eq. 4, the intra prediction performing unit 610 may generate the final predicted signal P by applying weighted averaging on the predicted signal $P_d$ generated according to direction mode prediction and the predicted signal P n d generated according to non-directional mode prediction.

$$P = w_1 \cdot P_d + w_2 \cdot P_{nd}(w_1 + w_2 = 2^b) \quad \text{[Eq. 4]}$$

In Eq. 4, b represents a shift value for integer operation. Also, the weights $w_1$, $w_2$ used for weighted averaging may be scalars or matrices. The weights may be set according to an agreement between the video encoding apparatus and the video decoding apparatus.

Figure 10:
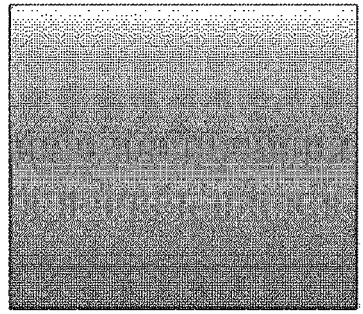
FIG. 10 illustrates weight values in the form of a matrix according to one embodiment of the present disclosure.
Figure 10:
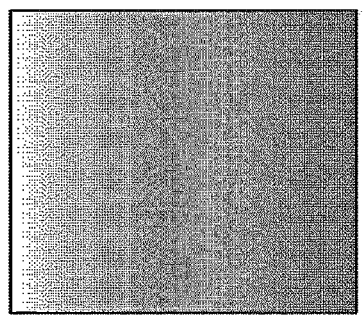
Figure 10:
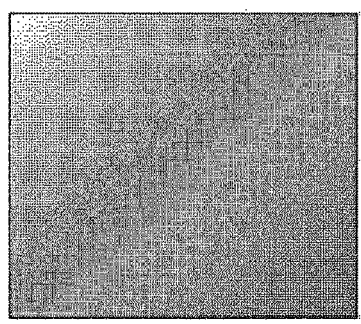

FIG. 10 illustrates weight values in the form of a matrix according to one embodiment of the present disclosure.

Meanwhile, the weights in the form of matrix may be determined based on the directional modes. For example, depending on the prediction modes, the matrix may be formed in such a way that a weight value decreases as the sample of the current block moves away from the reference samples used for prediction.

In another embodiment, the intra prediction performing unit 610 may parse an index indicating one of predefined k weights or matrices from a bitstream to determine the weight value or weight matrix.

In yet another embodiment, when the ISP technique is applied, partitioned subblocks may share the derived prediction mode of a current block as the same intra prediction mode. Alternatively, the intra prediction device may derive the prediction mode of the current subblock based on restored samples of a restored previous subblock and then may perform intra prediction on the current subblock using the derived prediction mode. At this time, whether to derive a prediction mode for each subblock may be implicitly determined based on the sizes of the subblocks.

Figure 11:
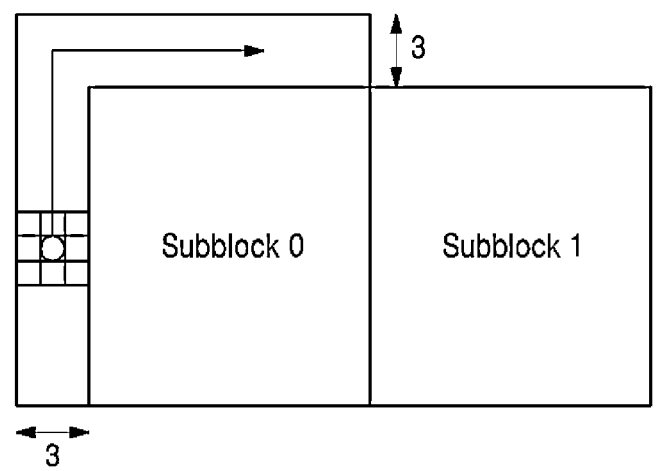
FIG. 11 illustrates derivation of a prediction mode at the time of sub-block partitioning according to one embodiment of the present disclosure.
Figure 11:
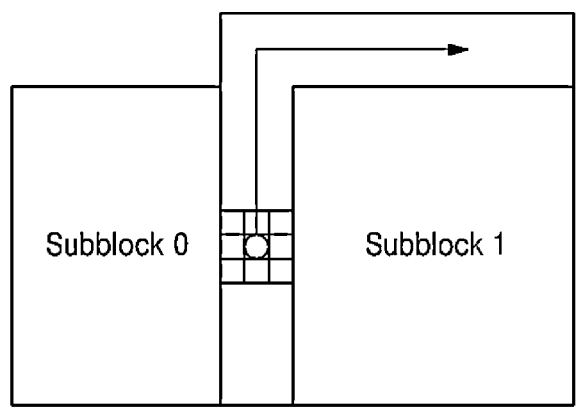

As shown in FIG. 11, when the current block is vertically partitioned into two subblocks, the intra prediction device may derive the current subblock's prediction mode based on the restored samples from the previous subblock. Meanwhile, although the example of FIG. 11 shows subblocks partitioned in the vertical direction, the prediction mode of the current subblock may be derived similarly for subblocks partitioned in the horizontal direction.

Also, when the ISP technique is applied, the intra prediction device may sequentially restore each subblock and perform intra prediction of the current subblock using restored reference samples from the previous subblock.

Figure 12:
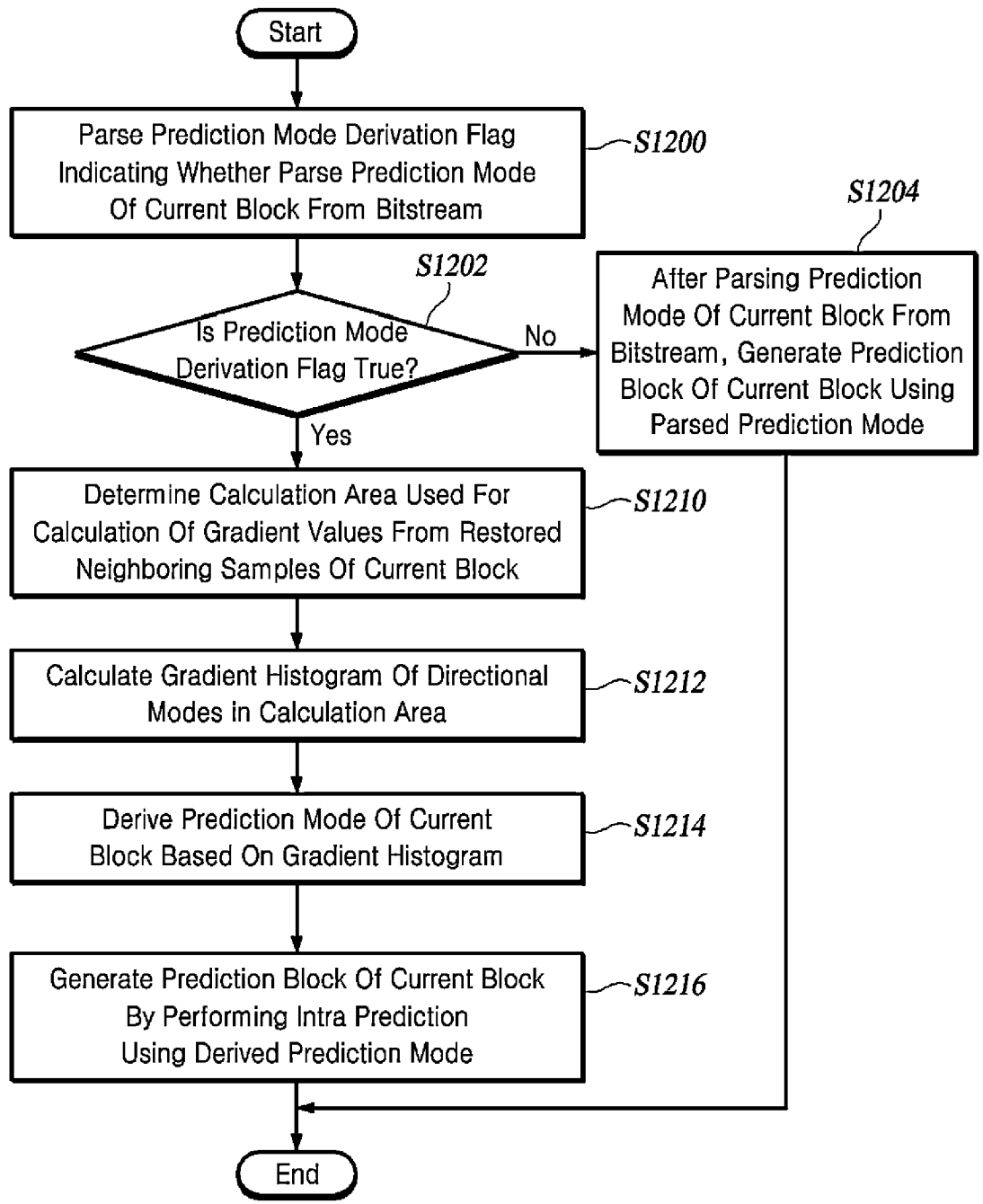
FIG. 12 is a flow diagram illustrating an intra prediction method using prediction mode derivation according to one embodiment of the present disclosure.

FIG. 12 is a flow diagram illustrating an intra prediction method using prediction mode derivation according to one embodiment of the present disclosure.

The video decoding apparatus parses a prediction mode derivation flag indicating whether to derive the prediction mode of a current block from a bitstream S1200. Meanwhile, the prediction mode derivation flag may be set by the video encoding apparatus regarding bit rate-distortion optimization and transmitted to the video decoding apparatus.

When the current block is unable to use the left and/or upper reference samples, including the picture boundary, slice boundary, or tile boundary, parsing of the prediction mode derivation flag may be implicitly omitted.

As another embodiment, before determining whether to perform prediction mode derivation, the video decoding apparatus may parse, from the bitstream, one or a plurality of flags that indicate whether a prediction mode of the current block is a non-directional mode, such as the Planar, DC, or matrix-based mode. When all the corresponding flags are false, the prediction mode derivation flag may be parsed.

The video decoding apparatus checks the prediction mode derivation flag S1202.

When the prediction mode derivation flag is false (No in S1202), the video decoding apparatus may parse the prediction mode of the current block from a bitstream and may generate the prediction block of the current block using the parsed prediction mode S1204.

On the other hand, when the prediction mode derivation flag is true (Yes in S1202), the video decoding apparatus skips parsing of the intra prediction mode of the current block and performs the subsequent steps S1210 to S1216.

The video decoding apparatus determines a calculation area used for calculating gradient values from restored neighboring samples of the current block S1210.

The video decoding apparatus may determine three rows of restored reference pixels on the left and top of the current block as the calculation area. At this time, the length of the calculation area located on the left and top of the current block may be set based on the width and height of the current block.

In another embodiment, the video decoding apparatus may parse a flag indicating the calculation area from the bitstream to set the calculation area between the left and upper parts of the current block.

In yet another embodiment, the calculation area may be determined implicitly according to an agreement between the video encoding apparatus and the video decoding apparatus. In this case, a step of determining the calculation area may be omitted.

The video decoding apparatus calculates a gradient histogram of directional modes in the calculation area of the current block S1212.

The video decoding apparatus calculates vertical and horizontal gradient values for restored reference samples located on the current block's second lines using a preset boundary detection filter. The video decoding apparatus calculates the gradient directions and magnitudes at the restored reference samples located on the second lines using vertical and horizontal gradient values. The video decoding apparatus calculates the gradient histogram of directional modes by calculating the directional mode of intra prediction closest to the gradient direction and then accumulating the gradient magnitudes in the histogram corresponding to the calculated directional mode.

The video decoding apparatus may subsample the restored reference samples located on the second lines based on a predetermined sampling interval and then may calculate the gradient histogram for the subsampled pixels. At this time, the predetermined sampling interval and positions of subsampled pixels may be defined according to an agreement between the video encoding apparatus and the video decoding apparatus. Alternatively, sampling intervals and subsampling positions of pixels may be determined based on the current block's size and/or aspect ratio.

The video decoding apparatus derives the prediction mode of the current block based on the gradient histogram S1214. At this time, the derived intra prediction mode may be a directional mode or a non-directional mode.

The video decoding apparatus may derive directional modes as follows.

The video decoding apparatus may determine a first direction mode having the largest value from the gradient histogram as the prediction mode of the current block.

Alternatively, the video decoding apparatus may determine the first directional mode having the largest value and a second directional mode having the second largest value from the gradient histogram as the prediction modes of the current block.

As another embodiment, the video decoding apparatus may additionally parse a prediction mode indication flag indicating one of the first directional mode and the second directional mode to determine the prediction mode of the current block according to the parsed flag value. The video decoding apparatus may parse the prediction mode indication flag from a bitstream when the difference between the histogram values of the first and second directional modes is less than or equal to a predetermined threshold value. On the other hand, when the difference between the histogram values of the two modes is greater than the predetermined threshold value, the video decoding apparatus may skip parsing the prediction mode indication flag. Alternatively, when the difference between the two histogram values is greater than or equal to a preset ratio compared to the sum of all histogram values, the video decoding apparatus may skip parsing the prediction mode indication flag.

The video decoding apparatus may derive the non-directional mode as follows.

When the histogram value of the first directional mode is smaller than a preset first threshold or the sum of values from the gradient histogram is smaller than a preset second threshold, the video decoding apparatus may determine the non-directional prediction mode as the prediction mode of the current block. At this time, the non-directional mode may be the DC or planar mode.

In another embodiment, when the ratio between the histogram value of the first directional mode and the sum of gradient histogram values is smaller than a preset ratio, the video decoding apparatus may determine the non-directional mode as the prediction mode of the current block.

As another embodiment, when the ratio between the sum of gradient histogram values and the number of pixels used for gradient calculation is smaller than a preset first ratio, or the ratio between the histogram value of the first directional mode and the number of pixels used for gradient calculation is smaller than a preset second ratio, the video decoding apparatus may determine the non-directional prediction mode as the prediction mode of the current block.

The video decoding apparatus generates a prediction block of the current block by performing intra prediction using the derived prediction mode S1216.

The video decoding apparatus may perform intra prediction using reference samples belonging to the left and top lines closest to the current block among the left and top restored reference samples without additional parsing. Alternatively, the video decoding apparatus may determine reference sample lines for intra prediction by parsing, from a bitstream, an index indicating which reference sample line is to be used among multi-line reference samples.

As another embodiment, the video decoding apparatus may generate the prediction block of the current block by generating a first prediction block of the current block using the first directional mode, generating a second prediction block of the current block using the second directional mode, and performing weighted averaging on the first prediction block and the second prediction block. At this time, weight values may be determined in proportion to the histogram values of the respective modes.

Although the steps in the respective flowcharts are described to be sequentially performed, the steps merely instantiate the technical idea of some embodiments of the present disclosure. Therefore, a person having ordinary skill in the art to which this disclosure pertains could perform the steps by changing the sequences described in the respective drawings or by performing two or more of the steps in parallel. Hence, the steps in the respective flowcharts are not limited to the illustrated chronological sequences.

It should be understood that the above description presents illustrative embodiments that may be implemented in various other manners. The functions described in some embodiments may be realized by hardware, software, firmware, and/or their combination. It should also be understood that the functional components described in this specification are labeled by " . . . unit" to strongly emphasize the possibility of their independent realization.

Meanwhile, various methods or functions described in some embodiments may be implemented as instructions stored in a non-transitory recording medium that can be read and executed by one or more processors. The non-transitory recording medium may include, for example, various types of recording devices in which data is stored in a form readable by a computer system. For example, the non-transitory recording medium may include storage media such as erasable programmable read-only memory (EPROM), flash drive, optical drive, magnetic hard drive, and solid state drive (SSD) among others.

Although embodiments of the present disclosure have been described for illustrative purposes, those having ordinary skill in the art to which this disclosure pertains should appreciate that various modifications, additions, and substitutions are possible, without departing from the idea and scope of the present disclosure. Therefore, embodiments of the present disclosure have been described for the sake of brevity and clarity. The scope of the technical idea of the embodiments of the present disclosure is not limited by the illustrations. Accordingly, those having ordinary skill in the art to which this disclosure pertains should understand that the scope of the present disclosure is not to be limited by the above explicitly described embodiments but by the claims and equivalents thereof.

REFERENCE NUMERALS

122: intra predictor
510: entropy decoder
542: intra predictor
602: prediction mode derivation determining unit
604: gradient calculation area determining unit
606: histogram calculation unit
608: prediction mode deriving unit
610: intra prediction performing unit

What is claimed is:

1. A method performed by a video decoding apparatus for intra prediction of a current block, the method comprising:
parsing a prediction mode derivation flag indicating whether to derive at least one prediction mode of the current block from a bitstream; and
checking the prediction mode derivation flag,
wherein, when the prediction mode derivation flag is true, the method includes:
determining a calculation area used for calculating gradient values from restored neighboring samples of the current block;
calculating a gradient histogram of directional modes in the calculation area for the current block;
deriving the at least one prediction mode of the current block based on the gradient histogram; and
generating a prediction block of the current block by performing intra prediction using the at least one derived prediction mode, and
wherein calculating the gradient histogram comprises:
calculating vertical and horizontal gradient values for restored reference samples included in the calculation area;
calculating gradient directions and gradient magnitudes at the restored reference samples using the vertical and horizontal gradient values;
calculating directional modes of intra prediction closest to the gradient directions; and
accumulating the gradient magnitudes in the gradient histogram corresponding to the directional modes.

2. The method of claim 1, further comprising:
parsing, from the bitstream, one or a plurality of flags that indicate whether the at least one prediction mode of the current block is a non-directional mode,
wherein, when all the flags indicating one of the non-directional modes are false, the prediction mode derivation flag is parsed.

3. The method of claim 1, wherein, when the prediction mode derivation flag is true, a subblock partitioning application flag is parsed from a bitstream to determine whether to perform subblock partitioning of the current block.

4. The method of claim 1, wherein determining the calculation area comprises:
determining three rows of restored reference pixels on left and top of the current block as the calculation area, and
wherein a length of the calculation area located on left and top of the current block is set based on a width and a height of the current block.

5. The method of claim 1, further comprising:
parsing a flag indicating the calculation area from the bitstream to set the calculation area between left and upper parts of the current block according to the flag indicating the calculation area.

6. The method of claim 1, wherein calculating the gradient histogram comprises:
calculating the vertical and horizontal gradient values for restored reference samples located on a top second line and a left second line based on the current block by using a preset boundary detection filter.

7. The method of claim 1, wherein deriving the at least one prediction mode comprises:
determining a first direction mode having a largest value from the gradient histogram as the at least one prediction mode of the current block.

8. The method of claim 1, wherein deriving the at least one prediction mode comprises:
determining a first directional mode having a first largest value and a second directional mode having a second largest value from the gradient histogram as a first prediction mode of the current block and a second prediction mode of the current block.

9. The method of claim 7, wherein deriving the at least one prediction mode comprises:
when a histogram value of the first directional mode is smaller than a preset first threshold or a sum of values from the gradient histogram is smaller than a preset second threshold, determining a non-directional prediction mode as the at least one prediction mode of the current block.

10. The method of claim 7, wherein deriving the at least one prediction mode comprises:
when a ratio between a histogram value of the first directional mode and a sum of gradient histogram values is smaller than a preset ratio, determining a non-directional mode as the at least one prediction mode of the current block.

11. The method of claim 3, wherein, when the subblock partitioning application flag is true, the current block is partitioned into subblocks, and a derived prediction mode of the current block is shared as the same intra prediction mode of the subblocks.

12. The method of claim 3, wherein, when the subblock partitioning application flag is true, the current block is partitioned into subblocks, and a prediction mode of a current subblock is derived based on restored samples of a restored previous subblock, and
wherein whether to derive a prediction mode for each subblock is implicitly determined based on sizes of the subblocks.

13. The method of claim 8, wherein generating the prediction block comprises:
generating the prediction block of the current block by generating a first prediction block of the current block using the first directional mode, generating a second prediction block of the current block using the second directional mode, and performing weighted averaging on the first prediction block and the second prediction block.

14. The method of claim 13, wherein generating the prediction block comprises:
when the first prediction mode of the current block and the second prediction mode of the current block are directional modes, generating a third prediction block of the current block by additionally using a non-directional mode, and
wherein the prediction block of the current block is generated by performing weighted averaging on the first prediction block, the second prediction block, and the third prediction block.

15. A method performed by a video encoding apparatus for intra prediction of a current block, the method comprising:
obtaining a prediction mode derivation flag indicating whether to derive at least one prediction mode of the current block; and
checking the prediction mode derivation flag,
wherein, when the prediction mode derivation flag is true, the method includes:
determining a calculation area used for calculating gradient values from restored neighboring samples of the current block;
calculating a gradient histogram of directional modes in the calculation area for the current block;
deriving the at least one prediction mode of the current block based on the gradient histogram; and
generating a prediction block of the current block by performing intra prediction using the derived at least one prediction mode, and
wherein calculating the gradient histogram comprises:
calculating vertical and horizontal gradient values for restored reference samples included in the calculation area;
calculating gradient directions and gradient magnitudes at the restored reference samples using the vertical and horizontal gradient values;
calculating directional modes of intra prediction closest to the gradient directions; and
accumulating the gradient magnitudes in the gradient histogram corresponding to the directional modes.

16. A method of storing a bitstream of a video into a non-transitory computer-readable recording medium, wherein the bitstream is generated by an encoding method for intra predicting a current block performed by a video encoding apparatus, wherein the method comprises:
obtaining a prediction mode derivation flag indicating whether to derive at least one prediction mode of the current block; and
checking the prediction mode derivation flag,
wherein, when the prediction mode derivation flag is true, the method includes:
determining a calculation area used for calculating gradient values from restored neighboring samples of the current block;
calculating a gradient histogram of directional modes in the calculation area for the current block;
deriving the at least one prediction mode of the current block based on the gradient histogram; and
generating a prediction block of the current block by performing intra prediction using the at least one derived prediction mode, and
wherein calculating the gradient histogram comprises:
calculating vertical and horizontal gradient values for restored reference samples included in the calculation area;
calculating gradient directions and gradient magnitudes at the restored reference samples using the vertical and horizontal gradient values;
calculating directional modes of intra prediction closest to the gradient directions; and
accumulating the gradient magnitudes in the gradient histogram corresponding to the directional modes.

\* \* \* \* \*